United States Patent [19]

Regehr et al.

[11] 4,072,478
[45] Feb. 7, 1978

[54] MIST REMOVER

[76] Inventors: Ulrich Regehr, 65, Susterfeld, Aachen, Germany, D-51; Siegfried Bulang, 177 Drievogelstraat, Kerkrade-West, Netherlands

[21] Appl. No.: 713,426

[22] Filed: Aug. 11, 1976

Related U.S. Application Data

[63] Continuation of Ser. No. 565,726, March 31, 1975, abandoned, and a continuation-in-part of Ser. No. 396,796, Sept. 13, 1973, abandoned, and Ser. No. 396,793, Sept. 13, 1973, abandoned.

[30] Foreign Application Priority Data

Sept. 22, 1972 Germany .............................. 2246474
Sept. 22, 1972 Germany .............................. 2246475

[51] Int. Cl.$^2$ ............................................ B01D 45/00
[52] U.S. Cl. .................................... 55/440; 55/257 PV
[58] Field of Search ....... 55/257 R, 257 PV, 257 QV, 55/257 MP, 440, 442–446, 461, 464, 483, 484, 497, 500, 511, DIG. 37; 261/DIG. 11, DIG. 77

[56] References Cited

U.S. PATENT DOCUMENTS

| 427,019 | 4/1890 | Stilwell | 55/464 |
|---|---|---|---|
| 521,199 | 6/1894 | Austin | 55/464 |
| 622,757 | 4/1899 | Carpenter | 55/442 |
| 1,463,769 | 7/1923 | Wood | 55/442 |
| 1,519,428 | 12/1924 | Wilisch | 55/443 |
| 1,810,090 | 6/1931 | Seil | 55/440 |
| 2,400,623 | 5/1946 | Baird et al. | 55/440 |
| 2,555,125 | 5/1951 | Gregory | 55/461 |
| 3,338,035 | 8/1967 | Dinkelacker | 55/464 |
| 3,415,502 | 12/1968 | Munters | 261/DIG. 11 |
| 3,527,030 | 9/1970 | Hungate | 55/440 |
| 3,540,702 | 11/1970 | Uyama | 261/DIG. 11 |
| 3,748,832 | 7/1973 | Furlong et al. | 55/257 PV |
| 3,864,110 | 2/1975 | Wyman et al. | 55/440 |

FOREIGN PATENT DOCUMENTS

| 828,547 | 12/1969 | Canada | 55/440 |
|---|---|---|---|
| 1,294,935 | 5/1969 | Germany | 55/440 |
| 9,938 of | 11/1908 | United Kingdom | 55/440 |
| 27,925 of | 6/1904 | United Kingdom | 55/442 |

*Primary Examiner*—Frank W. Lutter
*Assistant Examiner*—David L. Lacey
*Attorney, Agent, or Firm*—Karl F. Ross

[57] ABSTRACT

An apparatus for removing mist from a flow of gas comprises a plurality of partitioning walls and a plurality of trough-shaped separator plates, of generally V-shape, arranged to define a plurality of tortuous rectangular channels through which a gas can flow from a gas inlet portion to a gas outlet portion. Each separator plate comprises a plurality of chevron shaped directing grooves centrally disposed between each pair of partitioning walls and flat run off zones between the chevron shaped directing grooves and the partitioning walls.

Each plate comprises a plurality of successive generally planar pieces arranged to form a V-shaped trough.

12 Claims, 4 Drawing Figures

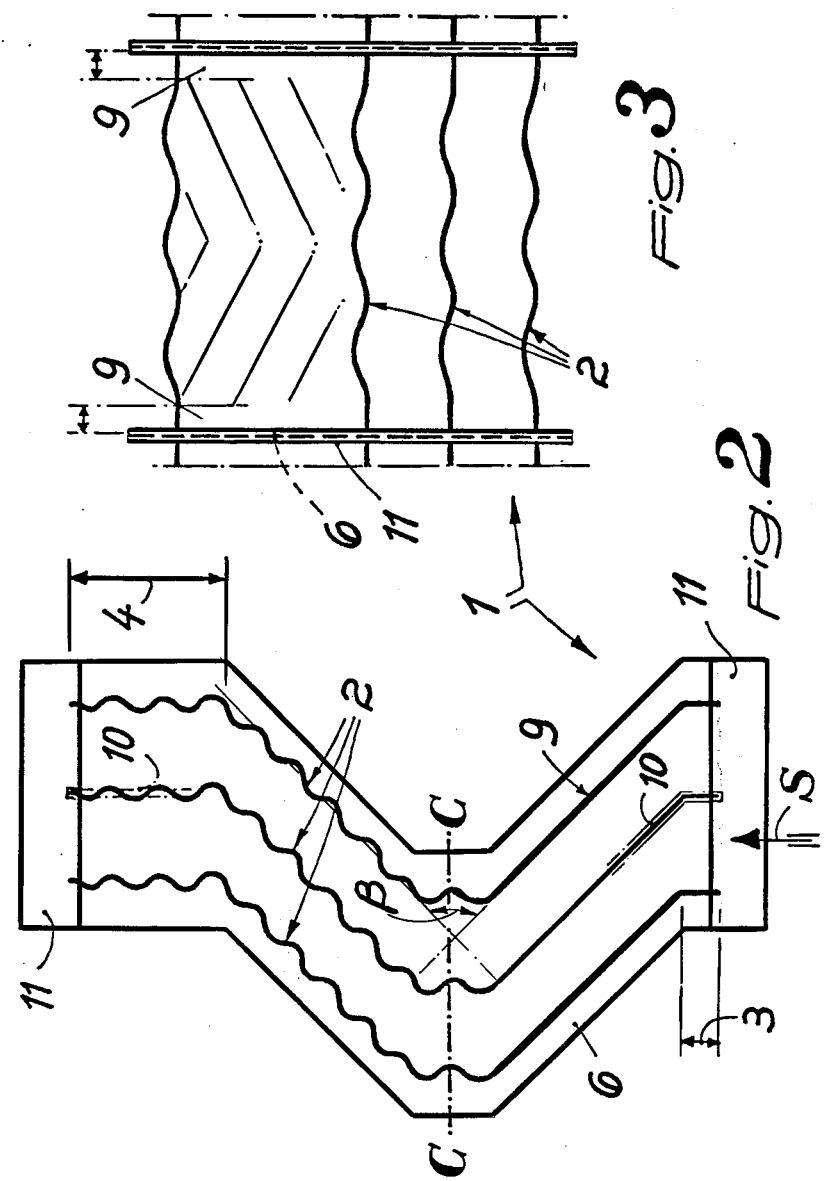

MIST REMOVER

REFERENCE TO RELATED APPLICATIONS

This application is a continuation of Ser. No. 565,726, filed Mar. 31, 1975 now abandoned, and a continuation-in-part of copending applications Ser. Nos. 396,793 and 396,796 both filed Sept. 13, 1973 and both now abandoned.

BACKGROUND OF THE INVENTION

Field of the Invention

This invention relates to means for removing entrained of liquid from a flow of gas by a novel contacting means and more particularly, to mist separators having a plurality of separating walls arranged parallel to each other which, in combination with cross members, define generally rectangular gas-flow channels wherein a finally divided liquid can be removed from a flowing gas.

Description of the Prior Art

In known mist separators, the separating plates are typically supported in parallel fashion with respect to one another to define a plurality of openings through which the gas may pass. The separating plates usually include a plurality of protrusions or ridges for trapping water droplets which impinge on the separating plates. The liquid droplets once entrapped have a tendency to become reentrained in the passing gas and the device is thus functionally defective. The series of protrusions of sharp ridges define channels in which the liquid droplets tend to stay when removed from the gas. It is therefore, an object of this invention to remove the liquid from the channels while preventing their re-entrainment into the gas flow.

When a liquid-containing gas flows through a mist eliminator of this general type, the inertia of the moving liquid droplets causes them to diverge from the direction of flow of the gas stream as the gas travels through a tortuous path and the liquid droplets impinge on the surface of the separating plates. The magnitude of the entraining forces which act to prevent the elimination of the liquid droplets from the gas stream depend on the gas velocity, the mass of the drop, the viscosity of the gas, the geometric relations in the separating structure. Typical mist eliminators are specially suited for a particular separating task for a given gas velocity and viscosity for a particular size of the smallest drop which must necessarily be removed by the eliminator. In actual operation, however, the working conditions fluctuate and it is therefore an object of this invention to construct a mist eliminator having a separation capability at very high efficiency.

SUMMARY OF THE INVENTION

The invention resides generally in an improvement in mist eliminators wherein each separator plate has a trough generally V-shaped in cross-section. When a plurality of plates are combined with a plurality of partitioning walls arranged at right angles to the separator plates, the partitioning walls and separator plates define a plurality of tortuous rectangular channels through which the gas can flow from a gas flow inlet portion to a gas flow outlet portion. The separator plate comprises a floor portion, two inclined oppositely-sloping wall portions joined to the floor portion at opposite extremities thereof, and two outwardly-extending lip portions fixed to the tops of the wall portions in substantially parallel relation to the floor portion. Each portion is generally planar or flat.

Each separator plate has a plurality of chevron-shaped directing grooves centrally disposed between each pair of partitioning walls and flat run-off zones between the chevron-shaped directing grooves and the partitioning walls. Further, the chevron-shaped directing grooves are in a nested-like arrangement with the apices pointing in the direction of gas flow from the gas-inlet portion to the gas-outlet portion. The chevron-shaped directing grooves are preferably uniformily arranged adjacent one another on each separator plate such that a continuous pattern of directing grooves exists from the gas-inlet portion to the gas-outlet portion. Typically, the chevron-shaped directing grooves are formed by V-shaped sinusoidal corrugations extending continuously from the gas-inlet portion to the gas-outlet portion.

When the corrugations forming the chevron-shaped directing grooves extend uniformly over the whole length of the separating plates, except, possibly the inlet lip portion, rather than on just a preselected portion of the separating plates, the mist separation improves surprisingly with nearly complete separation occurring under various working circumstances. This effect may be due to a more or less uninterrupted turbulence which is forced upon the gas flow by the uniformly-spaced corrugations. This turbulence dominates the flow behavior of the gases in the immediate region of the chevron-shaped directing grooves between the inclined portions of the plates where the flow is faster than over the lip portion, by geometry. In contrast, a lower velocity is observed in the region immediately adjacent to the generally planar run-off zones, with decreased turbulence over the zones, thus permitting liquid droplets to descend gravitationally without reentrainment into the flowing gas. Particularly efficient operation of a mist remover of this type has been realized when the gas inlet portion is substantially smaller than the gas outlet portion. The omission of grooves in the inlet portion appears to improve the removal.

In order to enhance the broad-range capability of the mist remover, means for varying the spacing between the separating plates is included. One appropriate means is provided in the form of bonding strips joining the chamber partitioning walls at vertical extensions extending above and below the separating plates. An added advantage of simplicity of manufacture is incidentally experienced.

The apparatus of the invention may be constructed from many different materials such as polystyrene, polypropylene P.V.C., A.B.S., and stainless steel depending upon the working temperature at which the material is to be used and the necessary corrosion resistance. The following are examples of possible uses of a mist remover according to this invention.

A mist remover according to this invention was installed in an exhaust scrubber of a phosphorous acid plant. The mist remover, made of heat-resistant polystyrene had an area of 9 square meters handling 135,000 cubic meters per hour of gas at a velocity of approximately 4.2 meters per second.

Another mist remover according to this invention was installed in a scrubbing tower for eliminating soda lye drops from a hydrochloric gas stream. The eliminator of polypropylene having an area slightly in excess of 3 square meters handled 60,000 cubic meters of gas per hour at a gas velocity of about 5.3 meters per second.

Other mist removers of stainless steel, corrosion-resistant nickel-chrome steel, and other suitable metallic materials have been installed particularly in leaching solution evaporators in the paper pulp industry, with sea water desalinators, distillation columns, and special exhaust gas-cleaning plants and scrubbers.

BRIEF DESCRIPTION OF THE DRAWINGS

FIG. 2 is a diagrammatic section view taken along line A—A of FIG. 1.

FIG. 3 is a plan view of the apparatus of FIG. 1 as viewed in the direction of arrow B.

DESCRIPTION OF THE PREFERRED EMBODIMENT

Figure 1:
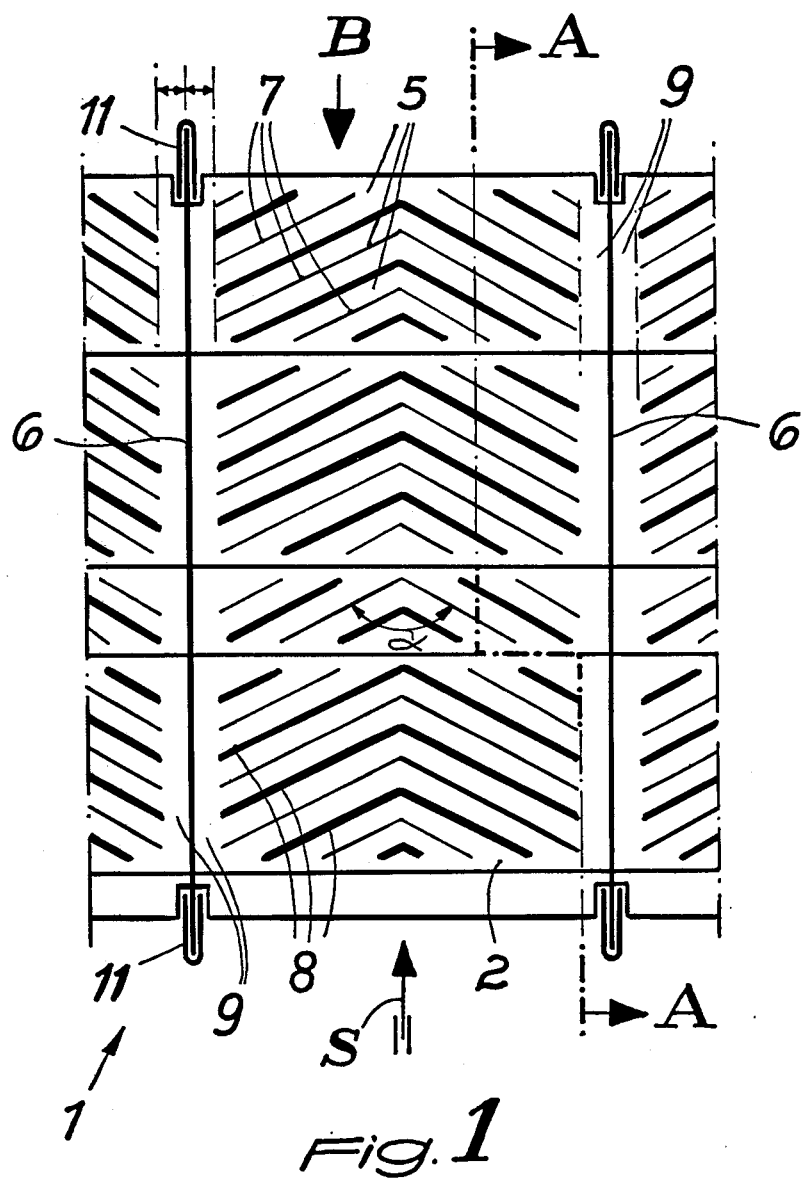
FIG. 1 is a diagrammatic elevation view of a portion of an apparatus according to this invention.

In FIG. 1, the apparatus 1 is shown in an elevational view to comprise a separator plate 2. The separator plate has a plurality of chevron-shaped directing grooves 5. These directing grooves function to create a more or less homogeneous isotropic turbulence in a gas flowing over the surface of the separator plate 2 in the direction of arrow S. The arrow S indicates the flow direction of the gas in an apparatus according to this invention. This gas first comes into contact with the gas-inlet portion 3 of the separator plate 2, travels the length of the separator plate 2 in close proximity to the directing grooves 5, leaves the apparatus at the gas-outlet portion 4. The inlet portion 3 is generally substantially smaller than the outlet portion 4.

The chevron-shaped directing grooves 5 are preferably uniformly arranged adjacent to each other on the separator plate such that a continuous pattern of, equally spaced directing grooves 5 exists from but not including the gas-inlet portion 3 through the gas-outlet portion 4. The chevron-shaped directing grooves 5 are generally formed by V-shaped sinusoidal corrugations which point in the direction of the gas flow. In FIG. 1 the chevron-shaped directing grooves are schematically represented by a series of relatively thick lines 8 which represent the crests of the corrugations and relatively thin lines 7 which represent the troughs of the corrugations. Generally the chevron angle α is between 125° and 135°.

The array of chevron-shaped directing grooves 5 are disposed in a central zone between the longitudinal edges of the plate 2 and between a pair of partition walls 6 arranged at right angles to the separator plates and perpendicular to the plane of the paper of FIG. 1. The partition walls in combination with a plurality of separator plates arranged in parallel relation to one another define a plurality of tortuous rectangular channels through which the gas flows. Between the zone of the directing grooves 5 and the partition walls 6 are flat run-off zones 9 which receive droplets of the mist collected by the separating plates 2 and directed by the directing channels 5 from the separating plate toward the partition walls 6. In this manner mist, once coalesced and separated from the flow of gas, is not reentrained.

Figure 4:
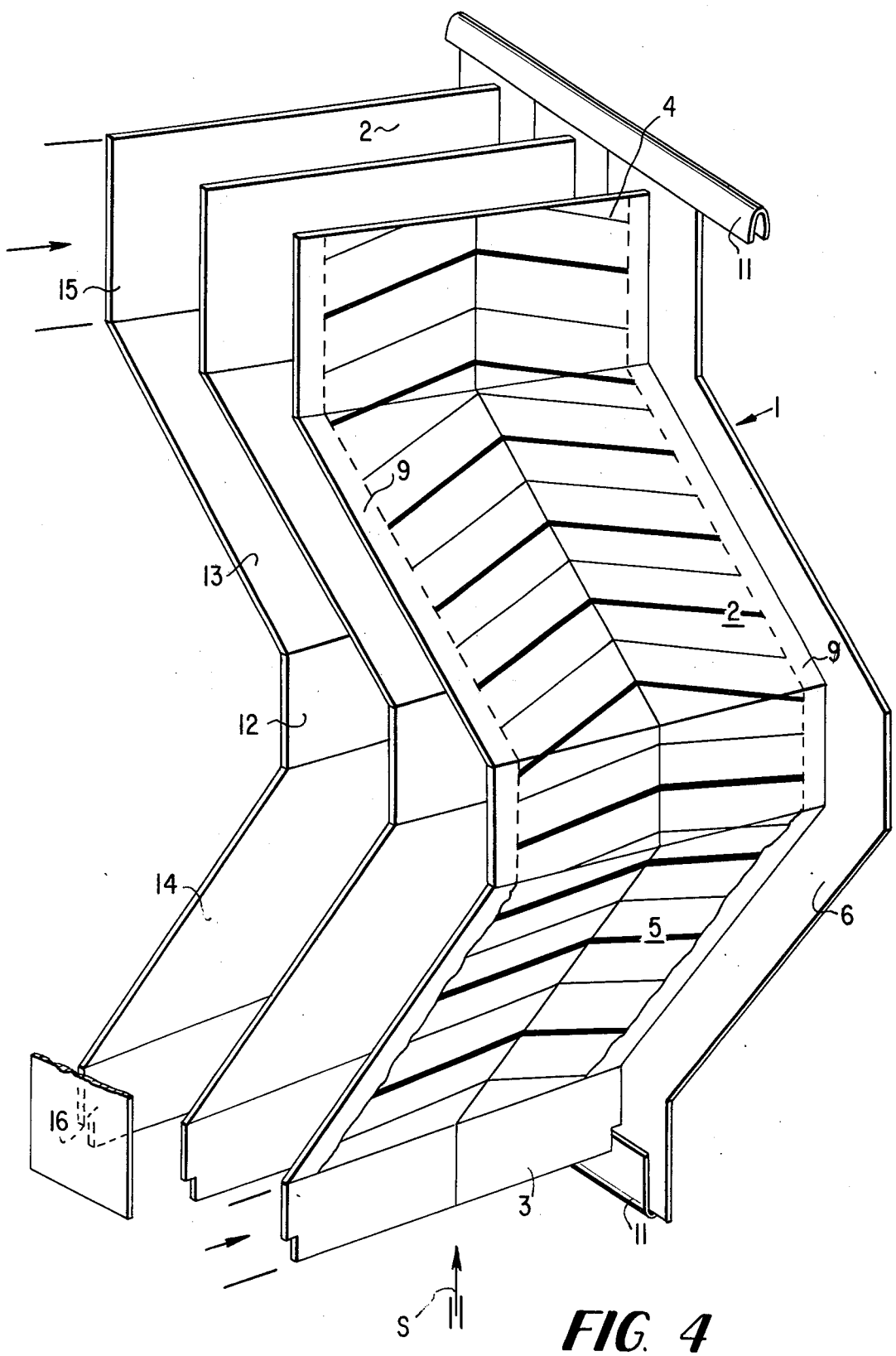
FIG. 4 is a perspective view of that portion of the apparatus shown in FIGS. 1-3.

As shown in FIG. 2 the separator plates 2 are each generally v-shaped in cross-section. That is, each separator plate comprises a central floor portion 12, two inclined oppositely-sloping wall portions 13 and 24 joined to the floor portion 12 on opposite sides thereof and two outwardly-extending lip portions 15 and 16 fixed to the tops of the wall portions 13 and 14 respectively and in substantially parallel relation to the floor portion 12. The lip portion 16 corresponds to the gas-inlet portion 3 while the lip portion 15 corresponds to the gas-outlet portion 4. The projected included angle β between the two wall portions 13 and 14 is preferably equal to or less than 90°. The separating plate 2 can be held in this v-shaped configuration in slot-shaped recesses 10 in the chamber (partition) walls 6 or by any other appropriate means for maintaining the relation between the separating plates and the partition walls. The chamber partition walls 6 project beyond the lips 15 and 16 of the trough-shaped separator plates and are joined together by means 11 such as bonding strips for varying the spacing between the separator plates. The spacing varying means 11 is most advantageously shown in FIGS. 1 and 4.

Although the invention has been described in considerable detail with reference to certain preferred embodiments thereof, it will be understood that variations and modifications can be effected within the spirit and scope of the invention as described above and as defined in the appended claims.

What is claimed is:

1. An apparatus for removing mist from a gas flow comprising a plurality of partitioning walls arranged in parallel relation to one another and a plurality of separator plates arranged in parallel relation to one another and at right angles to the partitioning walls, the partitioning walls further comprising means for maintaining the relation between the separator plates and the partitioning walls, the separator plates having a v-shaped cross-section comprising a floor portion, two inclined, oppositely-sloped wall portions joined to the floor portion at opposite extremities thereof, and two outwardly-extending lip portions fixed to the wall portions in substantially parallel relation to the floor portion, the projected included angle between the two wall portions being equal to or less than 90°, the partitioning walls and separator plates thus defining a plurality of tortuous rectangular channels through which a gas can flow from a gas flow inlet portion a gas flow outlet portion thereof, each separator plate further comprising a plurality of chevron-shaped directing grooves formed by V-shaped sinusoidal corrugations arranged uniformly adjacent to each other such that a continuous pattern of directing grooves exists from the end of the gas flow inlet portion through the gas flow outlet portion, the chevron-shaped directing grooves pointing from the gas flow inlet portion to the gas flow outlet portion and having a chevron angle of between 125° and 135°, said directing grooves being centrally disposed between each pair of partitioning walls and terminating short of the opposite edges of said plates such that run off zones free of grooves exist between the chevron-shaped directing grooves and each partitioning wall, the partitioning walls projecting above and below the separating plates and joined together by means for varying the spacing between the separator plates, the gas flow inlet portion of the separator plates having a lengthwise dimension substantially shorter than that of the gas flow outlet portion and being void of said directing grooves.

2. An apparatus for removing mist from a gas stream entraining droplets of the mist, said apparatus comprising:

a plurality of mutually parallel spaced apart partition walls; and a plurality of separator plates arranged in mutually spaced parallel relation to one another lying perpendicular to said partition walls and spanning the space between them, said separator plates being connected to said partition walls and forming an assembly with said partition walls defining at least one tortuous rectangular channel through which a gas can flow from a gas inlet at one end of said assembly to a gas outlet at the other end of the assembly, each separator plate having a generally V-shaped configuration between said ends and being formed with a central zone comprising a plurality of chevron-shaped directing grooves spaced inwardly from opposite edges of said plates and from said walls whereby each of said plates is formed with a nongrooved flat runoff zone on each side of said central zone from said inlet to said outlet, each of said grooves extending from one of said runoff zones to the other of said runoff zones of the respective plates.

3. The apparatus defined in claim 2 wherein each separator plate comprises a floor portion, two inclined oppositely sloping wall portions extending away from said floor portion toward said ends, and two outwardly extending lip portions fixed to said wall portions and substantially parallel to said floor portion and extending from said wall portions to said ends.

4. The apparatus defined in claim 3 wherein the projected included angle between said wall portions is at most equal to 90°.

5. The apparatus defined in claim 2 wherein the partition walls projected beyond each of said separator plates on each side thereof and are joined to the plates and, further comprising means for securing said separator plates together for varying the spacing between said separator plates.

6. The apparatus defined in claim 2 wherein said chevron-shaped directing grooves extend from the end of said inlet to the end of said outlet.

7. The apparatus defined in claim 2 wherein said chevron-shaped directing grooves are in the shape of V-section sinusoidal corrugations.

8. The apparatus defined in claim 2 wherein the chevron apex angle of each of said grooves is between 125° and 135°.

9. The apparatus defined in claim 2 wherein said chevron-shaped directing grooves have chevron apexes pointing toward said outlet.

10. The apparatus defined in claim 2 wherein said inlet has a length less than that of said outlet in the direction of gas flow therethrough.

11. The apparatus defined in claim 2 wherein each of said plates has a flat portion at said inlet.

12. The apparatus defined in claim 2, further comprising means on each of said partition walls for retaining the respective plate in a predetermined relationship with respect to the partition wall.

* * * * *